United States Patent [19]
Wavroch et al.

[11] Patent Number: 5,404,391
[45] Date of Patent: Apr. 4, 1995

[54] INCOMING CALL ALERT SYSTEM FOR CELLULAR TELEPHONES WITHOUT WIRED CONNECTION THERETO

[75] Inventors: Daniel P. Wavroch, Boucherville; Leonard Machado, Laval, both of Canada

[73] Assignee: Developpement des Technologies M.W.M. Inc., St. Leonard, Canada

[21] Appl. No.: 34,266

[22] Filed: Mar. 22, 1993

Related U.S. Application Data

[63] Continuation-in-part of Ser. No. 771,170, Oct. 3, 1991, abandoned.

[51] Int. Cl.[6] .......................................... H04M 11/02
[52] U.S. Cl. ................................................ 379/59
[58] Field of Search ............... 379/57, 59, 61, 372, 379/373, 375, 376, 396, 418; 455/33.1, 88

[56] References Cited

U.S. PATENT DOCUMENTS

| 4,421,953 | 12/1983 | Zielinski | 379/418 |
|---|---|---|---|
| 4,747,122 | 5/1988 | Bhagat et al. | |
| 4,833,709 | 5/1989 | Pasinski et al. | 379/376 |

FOREIGN PATENT DOCUMENTS

| 0280543 | 8/1988 | European Pat. Off. | 379/57 |
|---|---|---|---|
| 187143 | 2/1986 | Japan . | |
| 0058133 | 3/1989 | Japan | 379/376 |
| 0013050 | 1/1990 | Japan | 379/57 |
| 0079545 | 3/1990 | Japan | 379/61 |

OTHER PUBLICATIONS

Development of Advanced Mobil Telephone P3 (Personal Pocket Phone, NEC Research and Development No. 98, Jul. 1990, pp. 60–70.

*Primary Examiner*—Curtis Kuntz
*Assistant Examiner*—Dwayne D. Bost
*Attorney, Agent, or Firm*—Chilton, Alix & Van Kirk

[57] ABSTRACT

Each of the cellular telephones is adapted to receive a paging signal and to transmit a voice channel signal on a voice channel frequency in response to the paging signal. The alert system includes a receiver tuned to receive the voice channel frequency. A trigger circuit is connected to the output of the receiver to be activated by the receiver when the receiver receives a voice channel signal on the voice channel frequency. An alert is produced by either an audio signal generator, a vibratory generator or a radio mute, and each of the latter is connected to the ouput of the trigger. Thus, an alert is provided on receipt of an incoming telephone call.

14 Claims, 10 Drawing Sheets

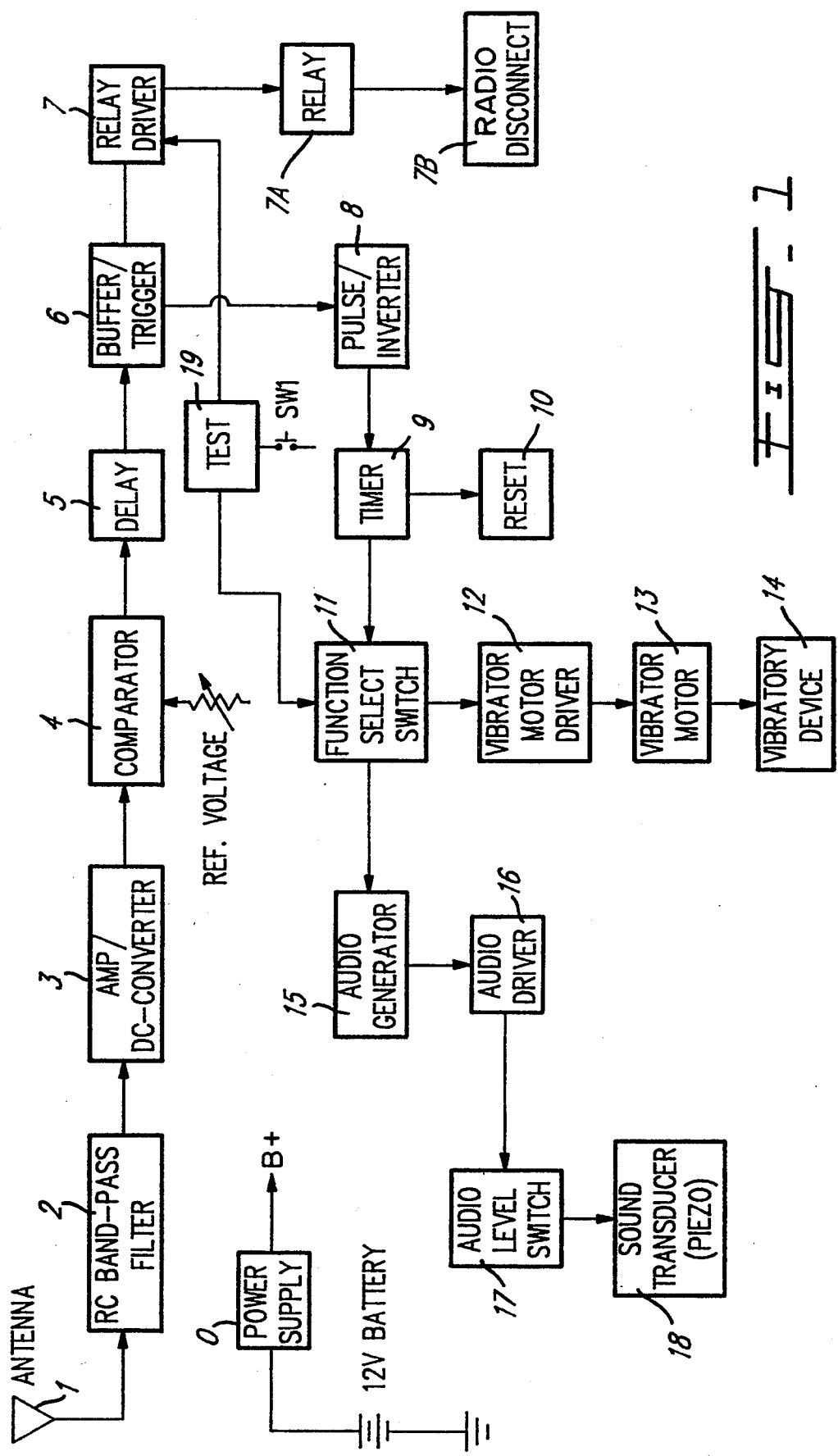

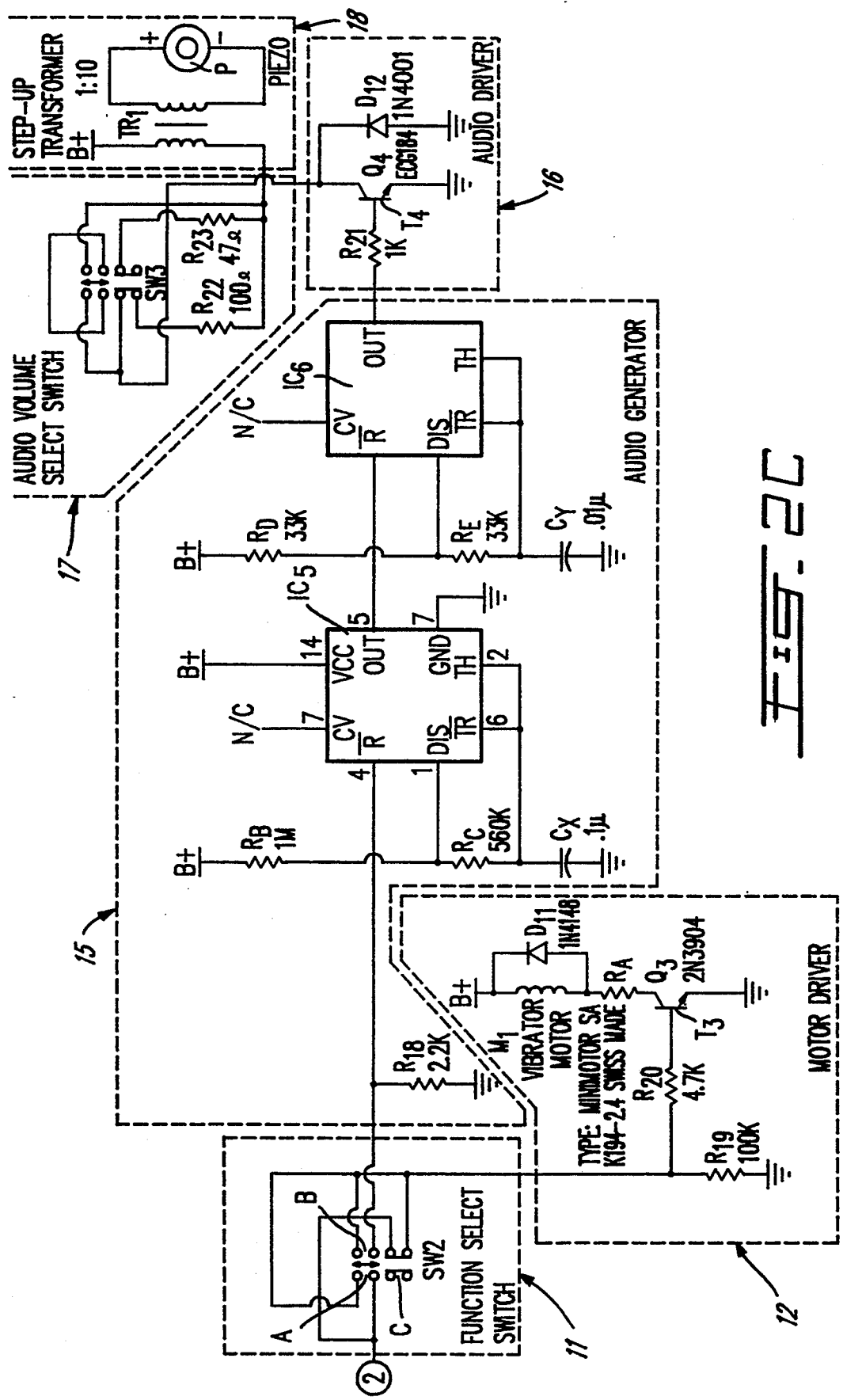

INCOMING CALL ALERT SYSTEM FOR CELLULAR TELEPHONES WITHOUT WIRED CONNECTION THERETO

This application is a continuation-in-part of application Ser. No. 771,170, filed, Oct. 3, 1991 (now abandoned).

BACKGROUND OF THE INVENTION

1. Field of the Invention

The invention relates to an incoming call alert system for use with cellular telephones. More specifically, the invention relates to such a system which is physically separate from and which is not wired to the cellular telephone in association with which it is used.

2. Description of Prior Art

It is known in the art to provide circuitry or the like for modifying the alert systems (e.g. ringers) of cellular telephones. Examples of such modifications are illustrated in, for example, U.S. Pat. No. 4,076,968, Wattenbarger, Feb. 28, 1978, U.S. Pat. No. 4,214,131, Bush et al, Jul. 22, 1980 and U.S. Pat. No. 5,025,467, Wheller, Jun. 18, 1991. Typically, the cellular telephones have to be opened up to receive the circuitry or to be wired thereto.

Thus, the '968 patent teaches a telephone set which includes circuitry for automatically controlling the intensity of the ringer. The ambient noise is detected by a noise measuring circuit whose output is fed to a control circuit. The ringer intensity is then set by the control circuit. As seen in FIGS. 1 and 2 of the '968 patent, the ringer is physically wired to the transmitter and the receiver and the signals travel along the conductive wiring. Accordingly, the set would have to be opened to install the circuitry.

The purpose of the '131 invention is to provide an electronic circuit to replace electromechanical ringers of a telephone set. The electronic circuit is illustrated in FIG. 5 of the patent. At recited in the abstract, the electronic ringer can be use ". . . either as a replacement for that ringer in existing telephone instruments or as a part of the original manufactured instrument". When used as a replacement it would of course be necessary to open up the telephone set to install the electronic circuitry.

The '467 reference includes a "remote" telephone ringer for use in a cellular telephone in a car. The ringer produces a loud, but pleasant, ring so that the user can be alerted to an incoming call even if he is some distance from the car. However, once again, the ringer is wired to the cellular telephone set. Thus, the wire 80 is connected into the cellular telephone. Accordingly, although the cellular telephone does not have to be opened to install the entire ringing system, it nevertheless does have to be opened for an installation of the ringing system to work with the cellular telephone.

In any case, signals are sent by wire from the cellular telephone to the ringing system.

It is also known that some cellular telephones do suffer from their inability to produce a loud enough audio alert signal, and from their inability to provide a non-audible alert signal when an audible alert signal would be inconvenient.

For example, when travelling in a car with the windows opened and the car radio turned ON, the background noise will typically mask the cellular telephone ringer so that telephone calls could be missed. Also, when attending meetings or when in restaurants, it could be disruptive to receive an audible alert signal so that it would be advantageous to have a non-audible alert signal so that the telephone owner will be alerted about a telephone call without providing any disruption.

SUMMARY OF INVENTION

It is therefore an object of the invention to provide an incoming call alert system for use with a cellular telephone which is physically separate from and is not wired to the cellular telephone in association with which it is used.

More specifically, it is an object of the invention to provide a system which provides a variety of audible and non-audible alert signals.

In accordance with a particular embodiment of the invention there is provided incoming call alert system for use with cellular telephones, each said cellular telephone being adapted to receive a paging signal and to transmit a carrier signal on a voice channel frequency in response thereto;

said call ale system comprising:

receiver means tuned to receive said carrier signal on said voice channel frequency;

trigger means connected to said receiver means and adapted to be activated by said receiver means when said receiver means receives said carrier signal on said voice channel frequency; and alert means connected to said trigger means and adapted to be activated upon activation of said trigger means;

whereby, to provide an alert to an incoming call.

In accordance with a further embodiment, said carrier signal is modulated by a modulating signal;

said receiver means includes means for demodulating said carrier signal to recover said modulating signal;

said trigger means being activated by said modulating signal.

BRIEF DESCRIPTION OF DRAWINGS

The invention will be better understood by an examination of the following description, together with the accompanying drawings, in which:

FIG. 1 is block diagram of one embodiment of the invention;

FIGS. 2A, 2B, and 2C together form a schematic diagram of the embodiment illustrated in FIG. 1;

DESCRIPTION OF PREFERRED EMBODIMENT

Figure 2A:
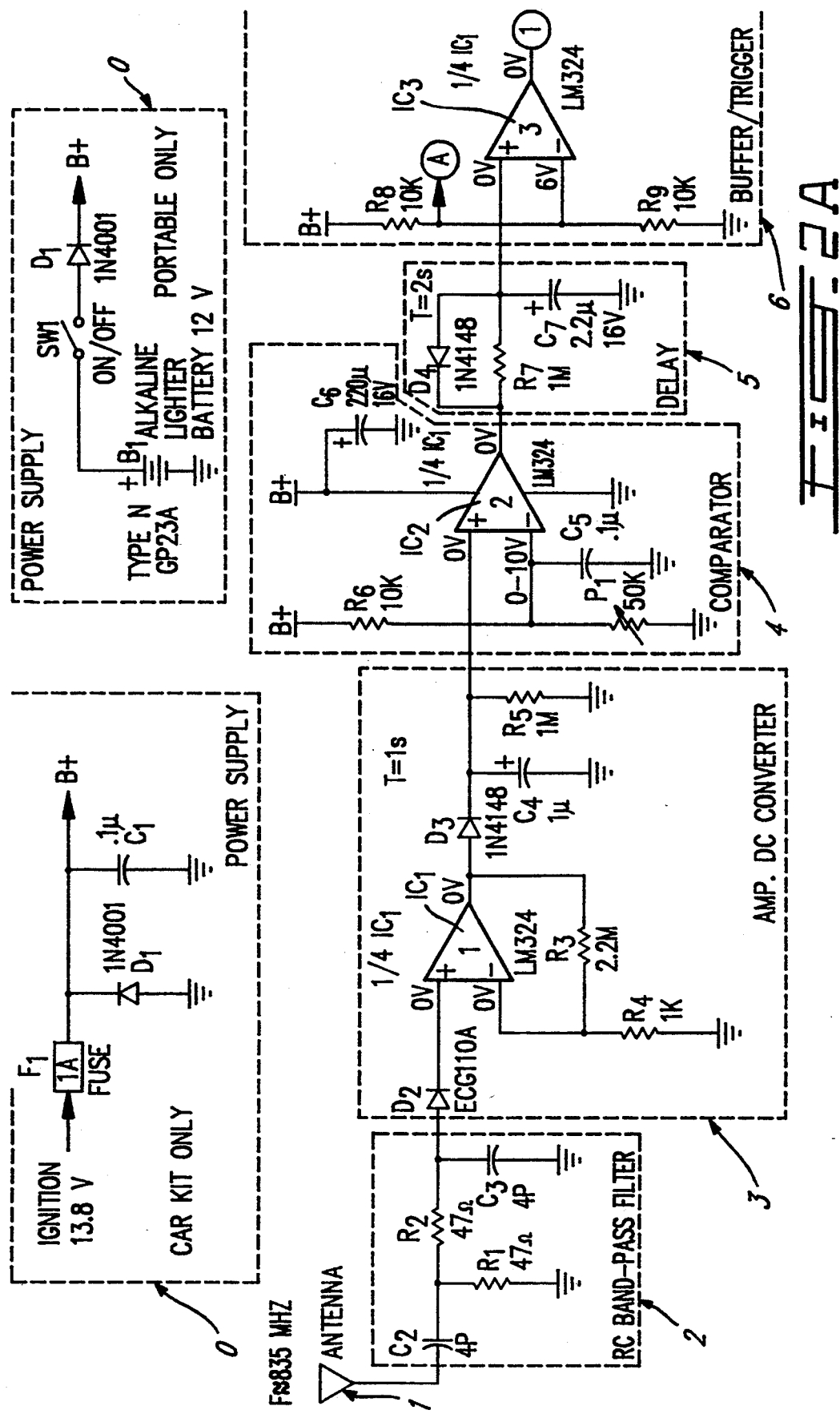

The call alert system in accordance with the invention is a unit which is physically separate from and which is not wired to the cellular telephone. It can be mounted, as is well known in the art, in a box-like housing which will contain selector switches, as discussed below, and a test switch as also discussed below. In one embodiment of the invention, the housing is permanently mounted in an automobile and is connected to the automobile radio to mute the radio on receipt of a telephone call by a cellular telephone in association with which the system is used. The same housing could include an audio signal alert which could be separate from or in association with the radio muting as will also be seen below.

A portable system would provide either an audible signal or a non-audible vibratory signal. As will be seen below, the portable unit can provide both the audible signal and the vibratory signal if such is desired.

Turning now to FIG. 1 of the drawings, the system comprises an antenna 1 which is connected to a tuned circuit 2. The tuned circuit is tuned to the carrier signal of the voice channel frequency of the cellular telephone. In North America, the voice channel frequency consists of a band of frequencies (824 MHz to 844 MHz) centered on 835 MHz. The tuned circuit is tuned to receive the band of voice channel frequencies.

The tuned circuit is connected to amplifier/DC converter 3 whose output is connected to a comparator 4. The second input of the comparator is connected to a source of reference voltage which is adjustable to adjust the sensitivity of the system. The output of the comparator is connected to a time delay means 5, and the output of the time delay means is connected to a buffer trigger 6.

The output of the buffer is connected to inverter 8 whose output is connected to a timer 9. A second input of the timer 9 is connected to a reset arrangement 10.

The output the timer is connected to three position function select switch 11. One of the output positions of 11 is connected to a motor driver 12 whose output is connected to a motor 13 which drives a vibrator device 14. The second output position of 11 is connected to an audio generator 15 whose output is connected to an audio driver 16. The output of the audio driver 16 is connected, through an audio level selector 17 to a sound transducer 18. The third output of 11 is connected to both 12 and 15.

Another output of buffer trigger 6 is connected to relay driver 7 which drives a relay 7A which is connected to a switch 7B connected between the car battery and the car radio. Thus, the switch can disconnect power from the radio.

Test means 19, including a test switch SW1, is connected to position select switch 11 and to relay driver 7.

To understand the operation of the illustrated embodiment, a brief description of the appropriate part of the operation of a cellular telephone system is in order. When the telephone number of a cellular telephone is dialed, the position of the cellular telephone is determined by the mobile's response to a paging signal that is sent by the mobile telephone exchange through the cell site controller and the radio channel unit to the cellular telephone. The cellular telephone will then generate an acknowledge signal to advise the exchange that it has received the page signal, thereupon, a voice channel, at one of the voice channel frequencies, is designated and, once again, through the action of the mobile telephone exchange, cell site controller and radio channel unit, the cellular telephone is set to receive and begins to transmit on the designated voice channel frequency. A ringing signal is then sent to the cellular telephone to alert the telephone user that an incoming call awaits him.

Turning now to the operation of the present alert system, the carrier signal transmitted by the cellular telephone on the voice channel frequency is picked up by the antenna 1 and passed through the tuned circuit 2. The signal is then amplified and converted to a DC level which is compared with a reference level in the comparator 4.

The comparator comprises one method of adjusting the sensitivity of the system. By increasing the reference level, a larger signal will be needed to set it off. However, this function can also be performed by adjusting the sensitivity of the buffer trigger 6.

To guard against the system being set off by spurious signals, time delay 5 is connected to the comparator 4. In a preferred embodiment, the time delay will implement a delay of 2 seconds.

The output of the time delay activates a buffer trigger 6 which in turn activates a time 9. The timer 9 determines the period for which the alert system remains ON.

The output of buffer trigger 6 is connected to relay driver 7 which activates a relay 7A to disconnect the car radio via switch 7B.

The output of buffer trigger 6 is also connected to a three position select switch 11. In one position of the switch 11, the trigger 6 is connected, through the switch 11, to a motor driver 12 which drives a motor 13 which, in turn, drives a vibrator 14. In a second position of the switch 11, the trigger 6 is connected to audio generator 15. The audio generator 15 is connected to audio driver 16 which is connected, through audio level selector 17, to a sound transducer 18.

In a third position of switch 11, trigger 6 is connected both to audio generator 15 and its following string as well as to motor driver 12 and its following string.

Power supply 0 provides power for driving all of the elements. Reset switch 10 resets the timer 9 when the call has been answered. Test switch SW1 provides a signal simulating the output of the trigger 6 to test the audio, vibrator and radio mute without the receipt of an actuating signal.

In the portable version, blocks 7, 7A and 7B will not be included in the housing. In this embodiment, the housing would be carried by the user who could carry it, for example, in his shirt pocket. It could be set to provide either an audible signal or a vibratory signal or both. In meetings or in restaurants, the vibratory signal would be selected and, upon receipt of an incoming call, the outer skin of the user would be vibrated to alert him to the incoming call.

In the car mounted embodiment, blocks 11, 12, 13, and 14 would not be needed and block 17 may or may not be needed and the trigger 6 would be connected directly to block 8 as well as to block 7. In the latter embodiment, a selector switch could be provided whereby to select either the audible signal or the radio mute. However, in the preferred embodiment, both the audible signal and the radio mute options are automatically provided.

In the portable mode, with the audio option selected, when the carrier signal on the voice channel frequency is transmitted by the cellular telephone and received by the call alert system, the audio generator 15 will generate an audio signal and actuate the audio driver 16. The audio driver 16, acting through the level select switch 17, will drive the sound transducer 18 to produce an audio sound at the audio frequency generated by the audio generator.

The sound transducer is selected to provide a loud output. In a preferred example, the sound transducer is a piezoelectric device, for example a Radio Shack #273-073 device.

When the vibratory path is selected by function switch 11, the vibratory device will be caused to vibrate. The user would carry the call alert system in, for example, his shirt pocket, or, in any case, close to his skin so that he will feel the vibrations. Thus, he can receive a call alert without an audio signal.

Turning now FIG. 2A, the tuned circuit 2 comprises a RC circuit consisting of resistors $R_1$, $R_2$ and capacitors $C_2$, $C_3$. The amplifier/DC converter 3 comprises integrated circuit $IC_1$, and the output of the RC circuit is connected to the positive terminal of $IC_1$. In one embodiment, the IC circuit comprises one quarter of integrated circuit LM324.

The comparator 4 comprises another IC circuit $IC_2$ which could comprise another quarter of LM324. The output of $IC_1$ is connected to the positive terminal of $IC_2$. The reference voltage is provided through voltage divider $R_6$ whose junction is connected to the negative terminal of $IC_2$. As can be seen, $P_1$ is made adjustable to adjust the sensitivity of the alert system.

The time delay 5 is provided by the RC circuit consisting of resistor $R_7$ and capacitor $C_7$. The buffer trigger 6 comprises IC circuit $IC_3$ which could be a third quarter of LM324. The output of the time delay $R_7$, $C_7$ is fed to the positive terminal of $IC_3$.

Figure 2B:
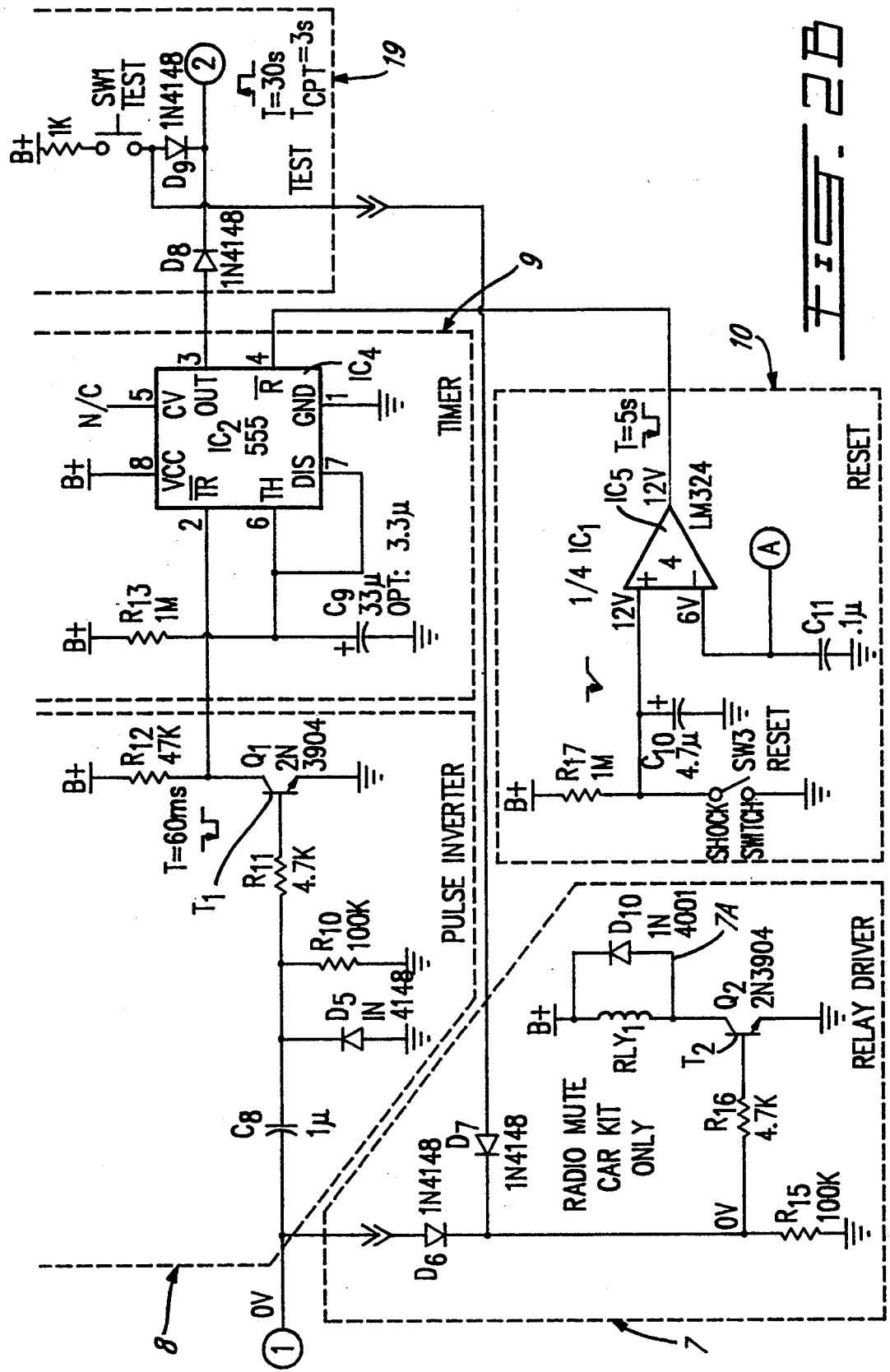

Turning now to FIG. 2B, the output of the buffer trigger 6 is fed to the trigger input of integrated circuit $IC_4$ which comprises the timer means 9. The output of $IC_3$ is fed to the trigger input of $IC_4$ through transistor $T_1$ to invert the ouput of $IC_3$ when $IC_4$ is integrated circuit 555. Obviously, if the timer means could be driven by a positive going signal, then inverter $T_1$ would not be needed.

The output terminal of $IC_3$ is also fed to the relay driver, comprising transistor $T_2$, through diode $D_6$. The transistor will activate the relay RLY #1.

As seen in FIG. 2C, the output terminal of $IC_4$ is connected to three position selector switch means 11 comprising switch SW2. In the C position of the selector switch 11 (as shown), the ouput of $IC_4$ is connected to motor driver transistor $T_3$ which drives the motor schematically illustrated at $M_1$.

In the B position of selector switch 11, the output of $IC_4$ is connected to an input terminal of integrated circuit $IC_5$ which could comprise one half of integrated circuit 556. The output of $IC_5$ is connected to an input of $IC_6$ which could comprise the other half of integrated circuit 556.

Integrated circuit $IC_5$ will produce an audio signal at one audio frequency and $IC_6$ will produce an audio signal at a second audio frequency, one of the frequencies being relatively higher than the other so that the audible sound which will be generated is a low frequency audio signal superimposed on a high frequency audio signal. The audible experience is to hear a high, two-tone, frequency audio signal which is chopped at the rate of the low frequency audio signal.

The output of the frequency generator is connected to the audio driver transistor $T_4$, and the output of $T_4$ is connected, through audio level selector switch SW3 to the primary of a transformer $TR_1$. The secondary of the transformer $TR_1$ is connected to a piezoelectric device P which provides the audible signal.

Test switch SW1 (see FIG. 2B) is provided for testing the circuitry as above-described. Reset arrangement 10 consists of operational amplifier $IC_5$ which could be the fourth quarter of integrated circuit LM324. Reset switch SW3, when closed, will cause an activating signal to be applied to $IC_5$. The output of $IC_5$ is connected to the reset terminal R of $IC_4$ to reset the timer.

In accordance with one embodiment of the invention, the timer 9 is set for 30 seconds (by adjusting the values of RC circuit $R_{13}$ and $C_9$).

Figure 3:
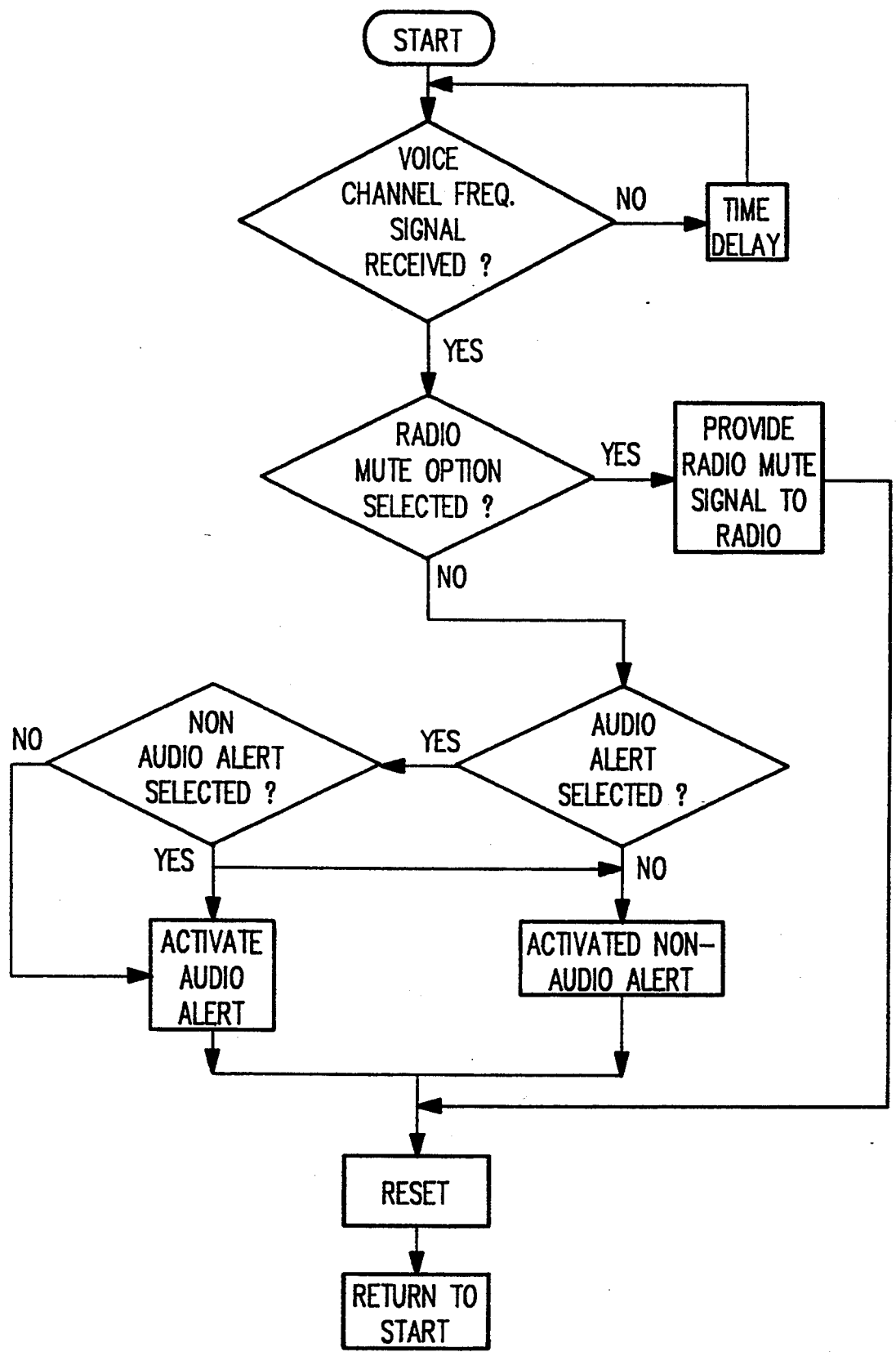
FIG. 3 is a flow chart of a program for driving a processor in said one embodiment of the invention using such a processor.

It will also be obvious to one skilled in the art that a good deal of the circuitry could be replaced by a single programmable microprocessor. In such an arrangement, the output of block 2 would be applied to an input of the microprocessor, and outputs of the microprocessor would be applied to blocks 7, 12 and 15. Select, Reset and Test switches would be applied to appropriate ones of appropriate inputs of the microprocessor. The microprocessor would be driven by a program in accordance with the flow chart as illustrated in FIG. 3 which is self-explanatory.

With the above-described embodiment, in spite of the sensitivity control, many spurious signals will trigger a false alert. Thus, any transmitter which transmits at a frequency in the voice channel frequency band, or in frequencies close to this band, or in harmonics of frequencies in this band, will set off a false alert.

In spite of this, the above-described embodiment is useful as long as one is willing to accept the limitations that false alerts will, from time-to-time, be set off.

However, to reduce the possibility of false alerts, or at least the number of such false alerts, one can take into account the fact that the carrier signal on the voice channel frequency is modulated by two modulating signals, namely, a Supervisory Audio Tone (SAT), which is typically 6 KHz, and a Signalling Tone (ST), which is typically 10 KHz. The SAT is ON at all times when the cellular telephone is in operation. The ST is ON only before the cellular telephone user answers a call, that is, before he places the cellular telephone in the OFF-hook condition. In accordance with a further embodiment of the invention, the modulating signal of the carrier signal in the voice channel frequency is detected, and the modulating signal is used to trigger the call alert system. A block diagram of such a system is illustrated in FIG. 4.

Figure 4:
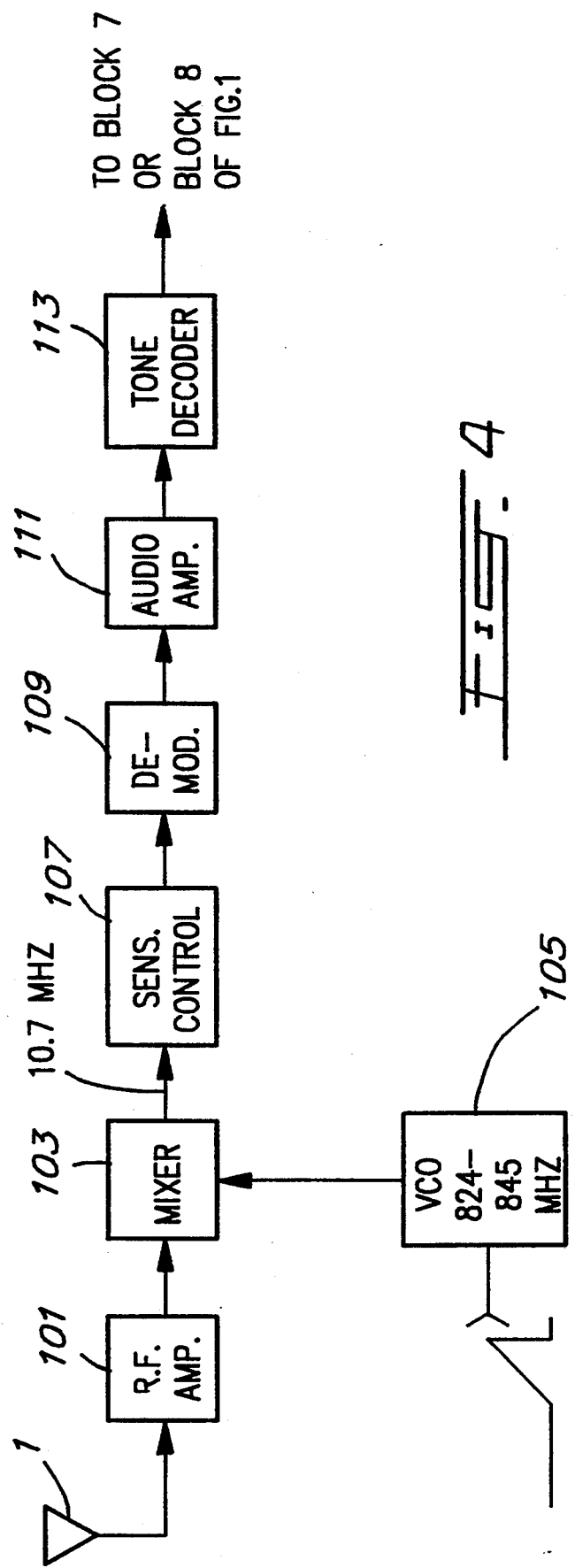
FIG. 4 is a block diagram of a second embodiment of the invention.

Referring to FIG. 4, the output of the antenna 1 is fed to RF amplifier 101 which is tuned to the band of voice channel frequencies. When the antenna receives such a voice channel frequency, it is passed by the RF amplifier after being amplified therein. The output of the RF amplifier 101 is fed to one input of a mixer 103. The other input of the mixer 103 is fed from a ramp oscillator 105. The ramp oscillator generates a frequency from 824 to 845 MHz.

The output of the mixer 103 is fed to a sensitivity control 107, and the output of the sensitivity control 107 is fed to a demodulator 109. The output of the demodulator 109 is either the 6 KHz or 10 KHz signal depending on the application. For the car mounted model, the output of the demodulator will be the 6 KHz signal. For the portable model, the output of the modulator will be the 10 KHz signal.

The audio signal is then amplified in audio amplifier 111, and the output of the audio amplifier is fed to the tone decoder 113. To complete the block diagram for the car mounted embodiment, the tone decoder 113 would be connected to relay driver 7 and following blocks of FIG. 1.

To complete the block diagram for the portable model, tone decoder 113 would be connected to pulse inverter 8 and following blocks of FIG. 1. A test switch, such as test switch 19 of FIG. 1, could be included with both embodiments.

Figure 5A:
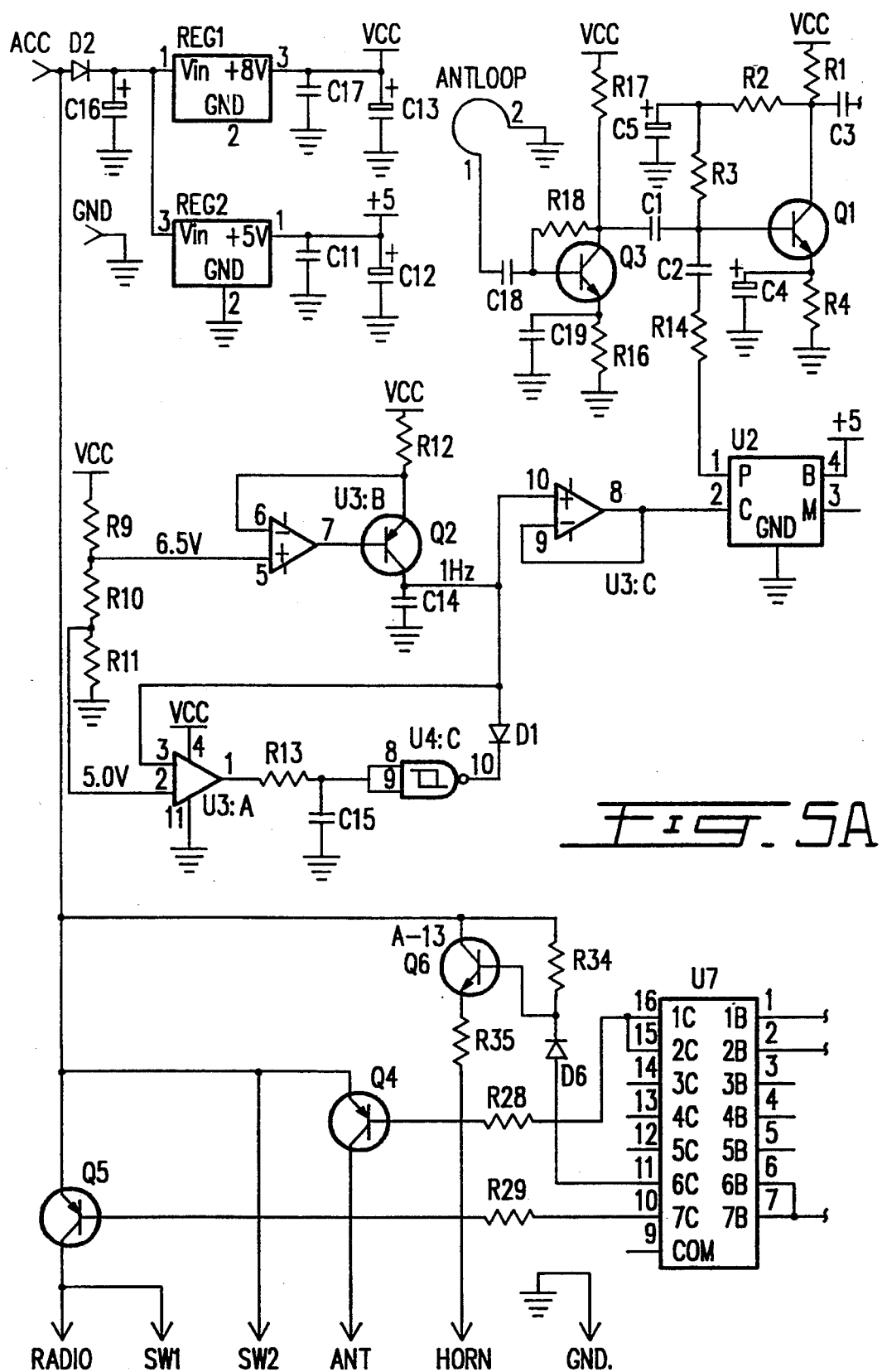
FIG. 5 is a circuit diagram of the block diagram of FIG. 4.
Figure 5B:
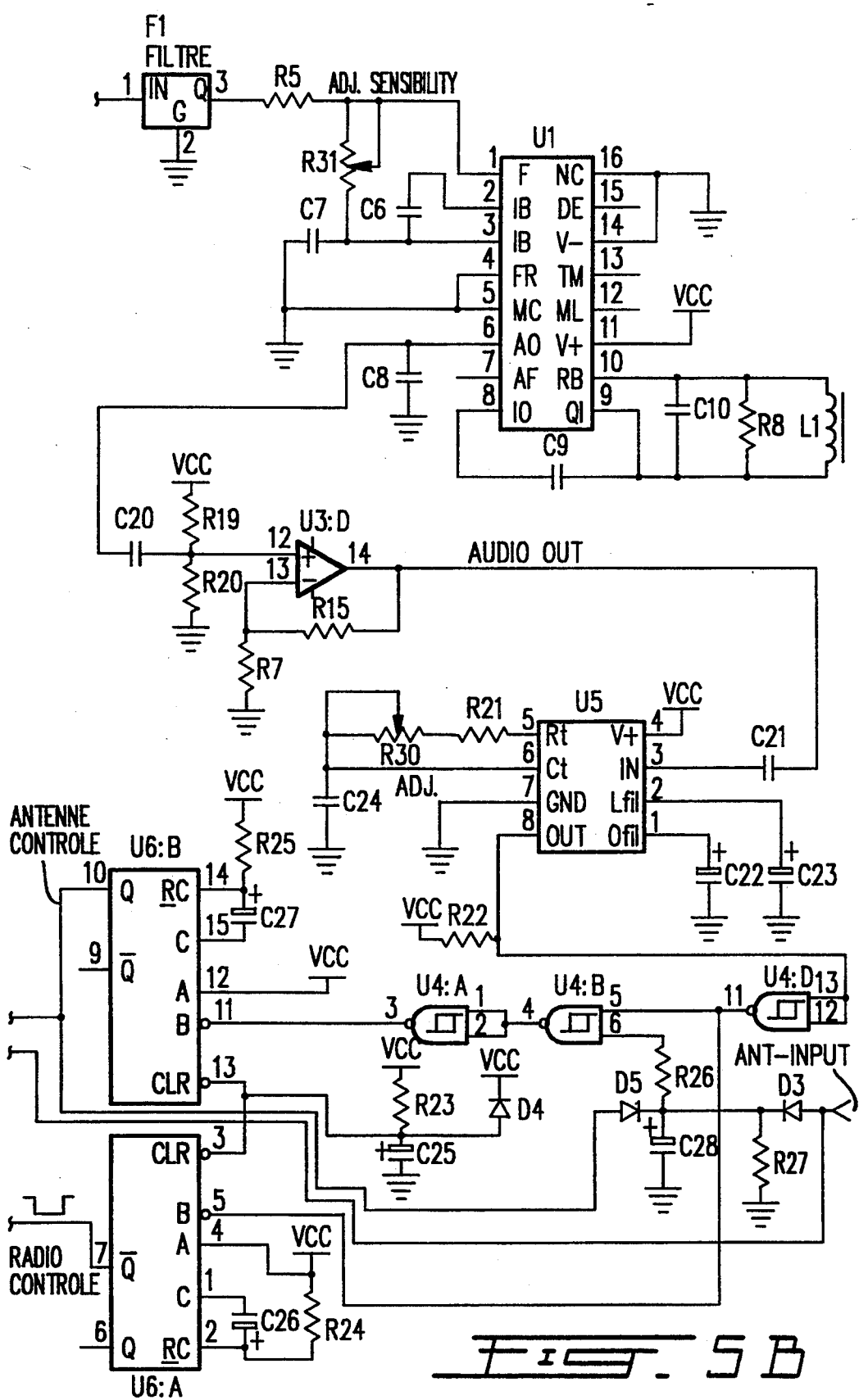

Turning now to FIG. 5, the output of the antenna A1 is fed to a buffer Q3 which prevents the output of the ramp from being transmitted. The output of Q3 is fed to Q1 which is also fed from the output of the ramp generator. The ramp generator consists of the elements R9, R10, R11, R12, R13, integrated circuit U3:A, U3: B, U4:C, U3:C, capacitors C14 and C15, diode D1, and integrated circuit U2. The ramp period is equal to 1 second.

The output of the mixer is, of course, the IF 10.7 MHz which is fed to filter F1. The output of filter F1 is fed to a sensitivity adjuster R31.

Concerning the sensitivity adjuster, it will of course be anticipated that other cellular telephones in the area will be able to set off false alerts when they transmit a voice channel frequency signal. By adjusting the sensitivity control R31, the degree of ease for setting off such a false alert is controlled. Thus, if R31 is set to a low sensitivity, then the other cellular telephone would have to be very close in order to set off a false alert.

Once again, inspite of all the adjustments, false alerts will be possible. This is acceptable for the following reasons:

1. If the other cellular telephone is close enough, then its own ringer will begin to ring so that there will be at least the implication of the possibility of a false alert.

2. Each cellular telephone includes a visual display indicating whether or not a call is incoming. By looking at the visual display, one can tell whether or not a false alert has been raised.

3. In any case, even if the cellular telephone is answered when it should not be answered because of the false alert, this does not cause a great deal of inconvenience to the user. In fact, having the call alert system provides a great deal more convenience than the inconvenience caused by, on rare occasions, answering the cellular telephone due to a false alert.

The output of the sensitivity adjuster is fed to pin 1 of integrated circuit U1. The IF is then demodulated using the circuitry of the integrated circuit U1 along with the quadrature detector consisting of the elements C10, R8 and L1.

The output on pin 6 of U1 contains an audio signal which includes both the 6 KHz and 10 KHz modulating signals. The audio signal is then fed to pin 3 of integrated circuit U5 through integrated circuit U3:D. In integrated circuit U5, the 10 KHz is filtered out and only the 6 KHz is output at pin 8 of U5. The 6 KHz signal will be pulsed for the same reason as the IF signal is pulsed and as was above explained. This pulsed signal is fed to terminal B of integrated circuit U6:A, and the circuitry of the integrated circuit along with the resistor R24 and capacitor C26 serves to maintain a constant low at terminal $\overline{Q}$ of integrated circuit U6:A as long as the detected output is pulsing.

The output of $\overline{Q}$ of integrated circuit U6:A is fed to pins 6B and 7B of integrated circuit U7, and the output of pin 7C of integrated circit U7 is fed to the power connection to the radio. When there is an output on 7C, transistor Q5 is turned OFF so that no power is fed to the radio. Accordingly, the radio will be turned OFF when a modulated carrier signal of the voice channel frequency is received by the call alert system.

The output of pin 8 of integrated circuit U5 is also fed, through integrated circuits U4:B, U4:A and U4:D to integrated circuit U6:B. The Q terminal of U6:B is fed to pin 1B of U7, and the outputs 1C and 2C of U7, which are affected by an input on pin 1B, are fed to the antenna control circuit through transistor Q4. When there is a signal at Q on U6:B, then the state of the antenna will remain as it is. This is to prevent the antenna from going up and down with the cutting OFF and turning ON of the radio.

With an input at pins 6B and 7B of U7, there is also an output on pin 6C of U7. This output is fed to transistor Q6 which is then fed to the horn circuit illustrated in FIG. 6.

Figure 6:
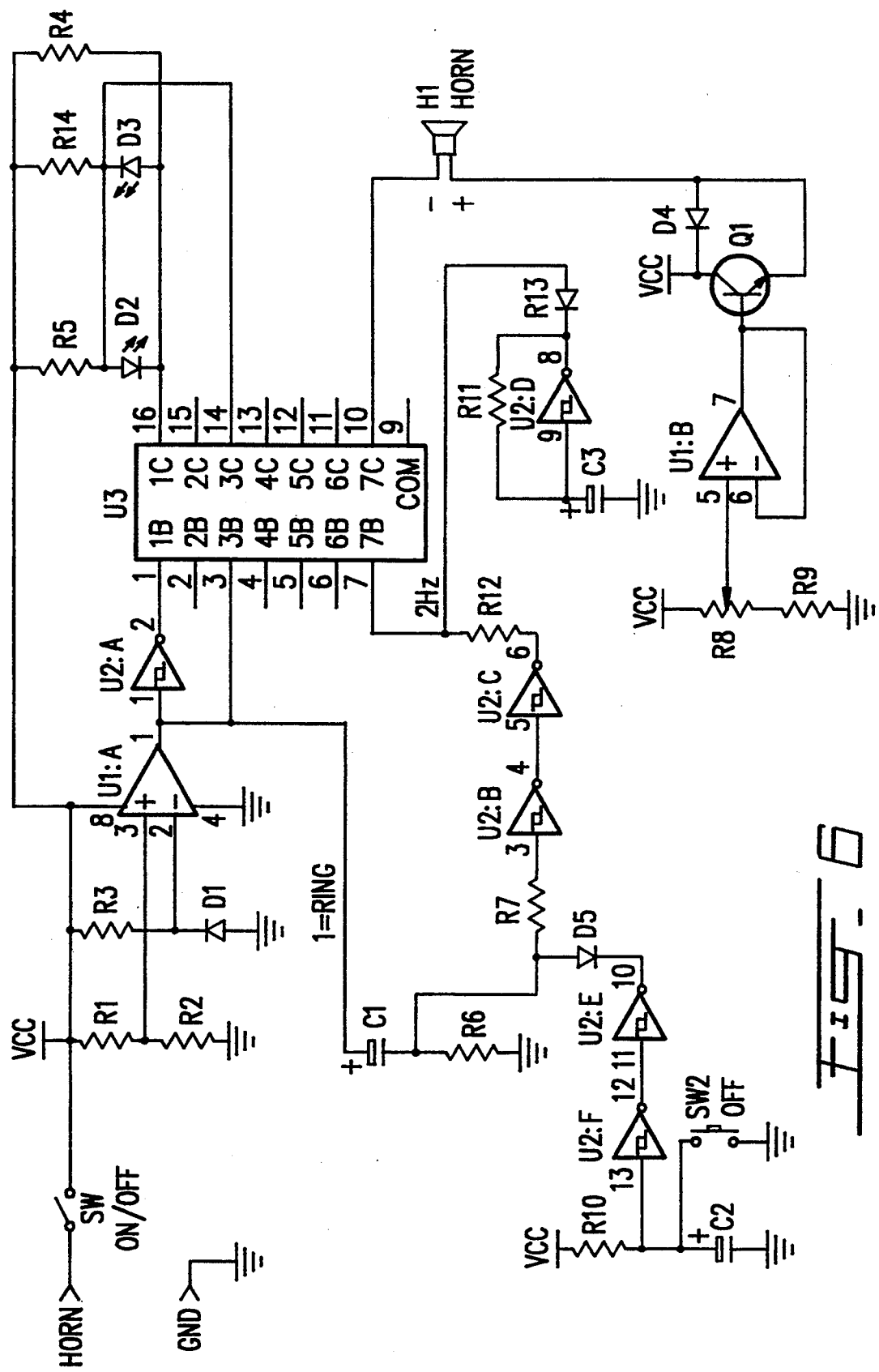
FIG. 6 is a circuit diagram of a possible addition to the second embodiment.

Turning to FIG. 6, the horn circuit can be either switched ON or switched OFF by switch SW. As seen in FIG. 6, the circuit includes two colored LEDs D2 and D3. When switch SW is switched ON, power is supplied to turn ON the green light D2 to indicate that the horn circuit is turned ON. When there is a signal from U7 indicating that a 6 KHz signal has been detected, the signal will be applied to pin 1 of integrated circuit U3. The output from pin 1C of U3 will turn OFF LED D2 and turn ON LED D3.

At the same time, an output from pin 7C of U3 will be applied to the horn HI.

As oscillator, formed by integrated circuits U2:D, along with associated circuitry, will modulate the horn driving signal by a 2 Hertz signal so that the horn will present a wavering tone. The volume of the horn is adjusted by adjustor R8 in association with rated circuit U1:B and transistor Q1.

With the above, we have described the alert system which would be mounted an automobile. For the alert system which is portable, element following U5 would be omitted. The output of U3:D would be fed to a circuit consisting of the elements following 1 in FIG. 2B.

A unit which could either be car-mounted or portable could also be included. In that case, the elements following 1 in FIG. 2B and the elements following integrated circuit U5 would be arranged in parallel in the same container.

Figure 7:
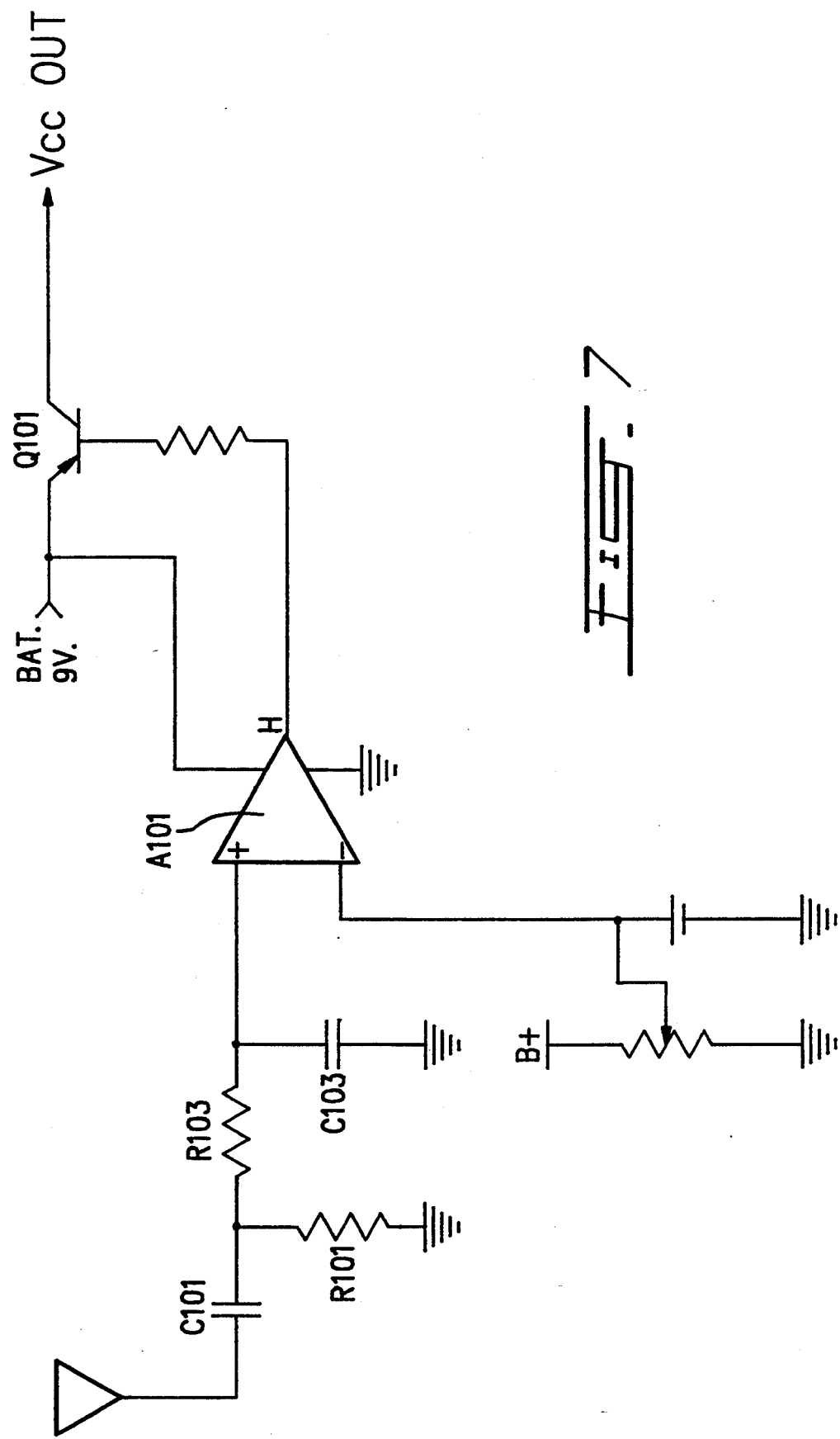
FIG. 7 is a circuit diagram for inserting battery power.

In accordance with a further improvement, there is provided a circuit which disconnects the battery in the portable unit except when a triggering signal is received. The circuit is illustrated in FIG. 7. As seen in FIG. 7, when a carrier signal on the band of voice channel frequencies is received by the antenna 1, then the frequency sensitive circuit consisting of capacitor C101, resistor R101, resistor R103 and capacitor C103 will provide an output to amplifier A101. The output of A101 will then provide a biasing signal for transistor Q101 so that the battery will be connected to the appropriate terminals in the circuit.

R105 can be used as an additional sensitivity control.

Although embodiments have been described, this was for the purpose of illustrating, but not limiting, the invention. Various modification, which will come readily to the mind of one skilled in the art, are within the scope of the invention as defined in the appended claims.

We claim:

1. An incoming call alert system for use with cellular telephones, each said cellular telephone being able to receive a paging signal and to transmit a carrier signal on a voice channel frequency in response thereto;
    said call alert system comprising;
    receiver means tuned to receive said carrier signal on said voice channel frequency;
    trigger means connected to said receiver means and activated by said receiver means when said receiver means receives a voice channel signal on said voice channel frequency; and alert means connected to said trigger means and activated upon activation of said trigger means;

comparator means connected between said receiver means and said trigger means; further including:

time delay means for delaying the activation of said alert means;

timer means connected to said trigger means, said alert means comprising:
1) means for producing an audio signal;
2) means for producing a vibration;
3) position selector means connected to said timer means;

one position of said three position selector means being connected to said means for producing an audio signal;

a second position of said three position selector means being connected to said means for producing a vibration; and a third position of said three position selector means being connected to both said means for producing an audio signal said means for producing a vibration.

2. An incoming call alert system for use with cellular telephones, each said cellular telephone being able to receive a paging signal and to transmit a carrier signal on a voice channel frequency in response thereto;

said call alert system comprising;

receiver means tuned to receive said carrier signal on said voice channel frequency;

trigger means connected to said receiver means and activated by said receiver means when said receiver means receives a voice channel signal on said voice channel frequency; and alert means connected to said trigger means and activated upon activation of said trigger means;

comparator means connected between said receiver means and said trigger means; further including:

time delay means for delaying the activation of said alert means;

timer means connected to said trigger means, said alert means comprising a means for producing a vibration.

3. A system as defined in claim 2 wherein said means for producing a vibration comprises a motor driver connected to said timer means, a motor connected to said motor driver and a vibrator connected to said motor.

4. An incoming call alert system for use with cellular telephones, each said cellular telephone being able to receive a paging signal and to transmit a carrier signal on a voice channel frequency in response thereto, said system muting a radio on receipt of said voice channel carrier signal;

said call alert system comprising:

receiver means tuned to receive said carrier signal on said voice channel frequency;

trigger means connected to said receiver means and activated by said receiver means when said receiver means receives voice channel signal on said voice channel frequency;

comparator means connected between said receiver means and said trigger means;

time delay means for delaying the activation of said alert means;

timer means connected to said trigger means; and alert means connected to said trigger means and activated upon activation of said trigger means;

said alert means comprising a relay connected to an audio disconnect in said radio;

whereupon, on receipt of said voice channel signal, the audio signal of said radio is disconnected.

5. A system as defined in claim 4 wherein said alert means comprises means for producing an audio signal, and said means for producing an audio signal comprises:

an audio generator connected to said timer means;

an audio driver connected to said audio generator; and a sound transducer connected to said audio driver.

6. A system as defined in claim 5 and including an audio level selector connected between said audio driver and said sound transducer.

7. A system as defined in claim 6 wherein said sound transducer comprises a piezoelectric device.

8. An incoming call alert system for use with cellular telephones, each said cellular telephone being able to receive a paging signal and to transmit a carrier signal on a voice channel frequency in response thereto, said voice channel frequency being a frequency selected from a predetermined frequency band;

said call alert system comprising:

receiver means tuned to receive said carrier signal on said voice channel frequency by sweeping said band;

trigger means connected to said receiver means and activated by said receiver means when said receiver means receives a voice channel signal on said voice channel frequency and when said voice channel signal has an amplitude above a predetermined threshold indicative that said receiver means are proximate said cellular telephone; and alert means connected to said trigger means and activated upon activation of said trigger means;

whereby, to provide an alert to an incoming call.

9. A system as defined in claim 8 wherein said carrier signal is modulated by a modulating signal;

said receiver means including means for demodulating said carrier signal to recover said modulating signal;

said trigger means being activated by said modulating signal.

10. A system as defined in claim 1 and further comprising means for adjusting said threshold.

11. A system as defined in claim 10 for use in muting a radio on receipt of said voice channel signal;

wherein, said alert means comprises a switch connected to an audio disconnect in said radio;

whereupon, on receipt of said voice channel signal, the audio signal of said radio is disconnected.

12. A system as defined in claim 10 and further including time delay means for delaying the activation of said alert means.

13. A system as defined in claim 12 and further including a timer means connected to said trigger means.

14. A system as defined in claim 12 wherein said alert means comprises means for producing an audio signal.

* * * * *